United States Patent
Cook et al.

(10) Patent No.: US 11,361,162 B2
(45) Date of Patent: Jun. 14, 2022

(54) MITIGATION OF CONFLICTS BETWEEN CONTENT MATCHERS IN AUTOMATED DOCUMENT ANALYSIS

(71) Applicant: Freedom Solutions Group, LLC, Downers Grove, IL (US)

(72) Inventors: David A. Cook, Barrington, IL (US); Andrzep H. Jachowicz, Tower Lakes, IL (US); Phillip Karl Jones, Barlett (IL)

(73) Assignee: Freedom Solutions Group, LLC, Chicago, IL (US)

( * ) Notice: Subject to any disclaimer, the term of this patent is extended or adjusted under 35 U.S.C. 154(b) by 84 days.

(21) Appl. No.: 16/719,649

(22) Filed: Dec. 18, 2019

(65) Prior Publication Data

US 2020/0125799 A1    Apr. 23, 2020

Related U.S. Application Data

(63) Continuation of application No. 15/249,379, filed on Aug. 27, 2016, now Pat. No. 10,515,152.

(Continued)

(51) Int. Cl.
*G06F 40/295* (2020.01)
*G06F 40/30* (2020.01)
(Continued)

(52) U.S. Cl.
CPC .......... *G06F 40/295* (2020.01); *G06F 3/0481* (2013.01); *G06F 40/205* (2020.01);
(Continued)

(58) Field of Classification Search
CPC .... G06F 40/295; G06F 40/284; G06F 40/247; G06F 40/40; G06F 40/232; G06F 40/205;
(Continued)

(56) References Cited

U.S. PATENT DOCUMENTS

| 5,632,002 A | 5/1997 | Hashimoto et al. |
| 5,966,710 A | 10/1999 | Burrows |

(Continued)

OTHER PUBLICATIONS

Z. Kozareva, "Bootstrapping Named Entity Recognition with Automatically Generated Gazetteer Lists," *Proceedings of the Eleventh Conference of the European Chapter of the Association of Computer Linguistics: Student Research Workshop* (EACL'06), Torino, Italy, Apr. 6, 2006, pp. 15-21.

(Continued)

*Primary Examiner* — Scott T Baderman
*Assistant Examiner* — Steve P Golden
(74) *Attorney, Agent, or Firm* — Nixon Peabody LLP (57) ABSTRACT

Each of a plurality of content matchers is executed upon a body of text in a document, identifying at least one match in the text and additionally assigning a match strength for each match. Where a conflict between a first match (have a first match strength associated therewith) and a second match (having a second match strength associated therewith) is noted, it is determined whether either of the first or the second match strength is greater than the other. If so, that match of the first and second matches corresponding to the lesser of the first and second match strengths is discarded. If the first or second match strengths are equal, then respective matcher ranks of the first matcher and the second matcher are compared such that the match of the first and second matches corresponding to the lesser of the first and second matcher ranks is discarded.

27 Claims, 2 Drawing Sheets

Related U.S. Application Data (60) Provisional application No. 62/211,097, filed on Aug. 28, 2015.

(51) Int. Cl.
| | | |
|---|---|---|
| *G06F 40/40* | (2020.01) | |
| *G06F 40/205* | (2020.01) | |
| *G06F 40/232* | (2020.01) | |
| *G06F 40/247* | (2020.01) | |
| *G06F 40/284* | (2020.01) | |
| *G06F 40/289* | (2020.01) | |
| *G06F 3/0481* | (2022.01) | |
| *G06F 40/253* | (2020.01) | |
| *G06F 40/106* | (2020.01) | |

(52) U.S. Cl.
CPC .......... *G06F 40/232* (2020.01); *G06F 40/247* (2020.01); *G06F 40/284* (2020.01); *G06F 40/289* (2020.01); *G06F 40/30* (2020.01); *G06F 40/40* (2020.01); *G06F 40/106* (2020.01); *G06F 40/253* (2020.01)

(58) Field of Classification Search
CPC ...... G06F 40/289; G06F 40/30; G06F 3/0481; G06F 40/253; G06F 40/106
See application file for complete search history.

(56) References Cited

U.S. PATENT DOCUMENTS

| | | |
|---|---|---|
| 7,849,081 B1 | 12/2010 | Chang et al. |
| 8,280,719 B2 | 10/2012 | Miller |
| 8,504,492 B2 | 8/2013 | Ghani et al. |
| 2005/0084152 A1 | 4/2005 | McPeake et al. |
| 2006/0163358 A1 | 7/2006 | Biderman |
| 2007/0230787 A1 | 10/2007 | Belitskaya et al. |
| 2008/0249764 A1 | 10/2008 | Huang et al. |
| 2008/0306943 A1* | 12/2008 | Patterson ............ G06F 16/2237 |
| 2011/0119576 A1 | 5/2011 | Aumann |
| 2011/0218884 A1* | 9/2011 | Kothari .................. G06Q 30/02 |
| | | 705/27.1 |
| 2012/0095993 A1 | 4/2012 | Shau |
| 2012/0150888 A1* | 6/2012 | Hyatt .................. G06F 21/6254 |
| | | 707/758 |
| 2012/0158744 A1* | 6/2012 | Tseng ...................... G06F 16/27 |
| | | 707/748 |
| 2017/0060836 A1 | 3/2017 | Cook et al. |

OTHER PUBLICATIONS

A. Carlson et al., "Learning a Named Entity Tagger from Gazetteers with the Partial Perception," *AAAI Spring Symposium: Learning by Reading and Learning to Read*, Palo Alto, California, USA, Mar. 23, 2009, pp. 7-13.

International Preliminary Report on Patentability for International Application No. PCT/US2016/049165, dated Mar. 6, 2018, 8 pages.

* cited by examiner

"MITIGATION OF CONFLICTS BETWEEN CONTENT MATCHERS IN AUTOMATED DOCUMENT ANALYSIS"

CROSS-REFERENCE TO RELATED APPLICATION

The instant application is a continuation of U.S. patent application Ser. No. 15/249,379, filed on Aug. 27, 2016, and claims the benefit of Provisional U.S. Patent Application Ser. No. 62/211,097 entitled "USER INTERFACE INCORPORATING DISCOVERY OF COMPANY NAMES IN A DOCUMENT" and filed Aug. 28, 2015, the teachings of which are incorporated herein by this reference.

Additionally, the instant application is related to U.S. patent applications entitled "AUTOMATED DOCUMENT ANALYSIS COMPRISING MULTIPLE PASSES BY COMPANY NAME RECOGNITION COMPONENTS" having U.S. patent application Ser. No. 15/249,374 and "AUTOMATED DOCUMENT ANALYSIS COMPRISING A USER INTERFACE BASED ON CONTENT TYPES" having U.S. patent application Ser. No. 14/249,377, filed on even date herewith, the teachings of which are incorporated herein by this reference.

FIELD

The instant disclosure relates generally to devices that perform automated document analysis and, in particular, to mitigation of conflicts between content matchers in such devices.

BACKGROUND

Devices, typically suitable programmed computing devices, that perform automated document analysis are well known in the art. Such devices are often capable of performing content recognition or matching analysis and provide enhanced man-machine user interfaces in which matches of specific types of content in document text are displayed and highlighted. Ideally, the processing performed to implement such content matching will lead to few, if any, false positives and few false negatives (misses) that would otherwise lead to an inaccurate representation of the document text presented by such user interfaces.

Where multiple content matchers are executed against a given body of text, in order to identify different content types, the possibility exists that one or content matchers will attempt to identify the same or overlapping portions of the text as matching different content types. For example, a device may have a content matcher configured to identify instances of dates in the body of text, as well as a content matcher configured to identify instances of units of measurement. In this scenario, ideally, the phrase "On Jan. 1, 2000 mL of fluid was purchased," would result in the identification of a date ("January 1") and a unit of measurement and accompanying value ("2000 ml"). However, if the date content matcher first analyzes this phrase, a match for "Jan. 1, 2000" will be identified. Consequently, the measurement unit content matcher will fail to identify "2000 ml" as a unit of measurement and accompanying value because "2000" was previously identified as an instance of a date.

Thus, content matching techniques that overcome these shortcomings would represent a welcome advancement in the art.

SUMMARY

The instant disclosure describes sets forth a content matching mitigation technique that addresses the above-noted shortcomings of the prior art. Thus, in an embodiment, each of a plurality of content matchers is executed upon a body of text in a document. As each content matcher executes, it identifies at least one match in the text and additionally assigns a match strength for each match thus identified. Thereafter, the identified matches are assessed and a conflict between a first match (have a first match strength associated therewith) and a second match (having a second match strength associated therewith) is noted. In this case, it is determined whether either of the first match strength or the second match strength is greater than the other. If so, that match of the first and second matches corresponding to the lesser of the first and second match strengths is discarded. If neither of the first or second match strengths is greater than the other (i.e., they are equal), then respective matcher ranks of the first matcher (responsible identifying the first match) and the second matcher (responsible for identifying the second match) are compared. When one of the first matcher rank and the second matcher rank is greater than the other, that match of the first and second matches corresponding to the lesser of the first and second matcher ranks is discarded. In the event that a match is discarded, that content matcher corresponding to the discarded match is re-executed on the body of text. In an embodiment, each of the content matchers is executed in an order determined according to their respective matcher ranks from highest to lowest.

BRIEF DESCRIPTION OF THE DRAWINGS

The features described in this disclosure are set forth with particularity in the appended claims. These features and attendant advantages will become apparent from consideration of the following detailed description, taken in conjunction with the accompanying drawings. One or more embodiments are now described, by way of example only, with reference to the accompanying drawings wherein like reference numerals represent like elements and in which:

DETAILED DESCRIPTION OF THE PRESENT EMBODIMENTS

Figure 1:
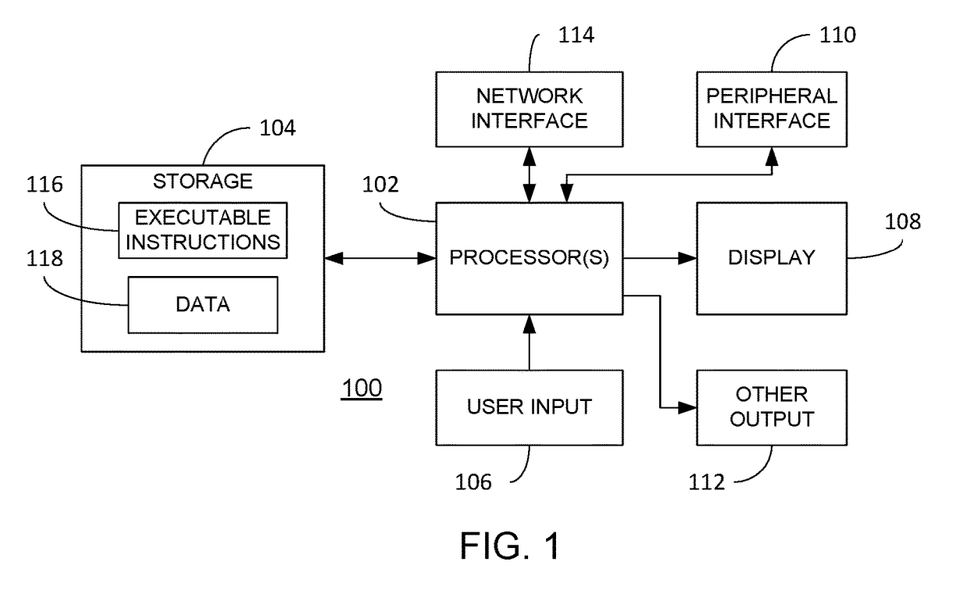
FIG. 1 is a block diagram of a device that may be used to implement various embodiments in accordance with the instant disclosure.

Referring now to FIG. 1, a representative device or machine 100 that may be used to implement the teachings of the instant disclosure is illustrated. The device 100, which may be embodied by, for example, a desktop, laptop or handheld computer, server computer or the like, may be used to implement one or more content type recognition components (content matchers) and perform the processing described in greater detail below. Regardless, the device 100 comprises at least one processing device 102 coupled to a storage component or memory 104. The storage component 104, in turn, comprises stored executable instructions 116 and data 118. In an embodiment, the processor 102 may comprise one or more of a microprocessor, microcontroller, digital signal processor, co-processor or the like or combinations thereof capable of executing the stored instructions 116 and operating upon the stored data 118. Likewise, the storage component 104 may comprise one or more devices such as volatile or nonvolatile memory including but not limited to random access memory (RAM) or read only memory (ROM). Further still, the storage component 104 may be embodied in a variety of forms, such as a hard drive, optical disc drive, floppy disc drive, network-based storage, etc. Processor and storage arrangements of the types illustrated in FIG. 1 are well known to those having ordinary skill in the art. In one embodiment, the processing techniques described herein are implemented as a combination of executable instructions and data within the storage component 104.

As shown, the device 100 may comprise one or more user input devices 106, a display 108, a peripheral interface 110, other output devices 112 and a network interface 114 in communication with the at least one processing device 102. The user input device 106 may comprise any mechanism for providing user input (such as inputs specifying a document to be analyzed) to the processor 102. For example, the user input device 106 may comprise a keyboard, a mouse, a touch screen, microphone and suitable voice recognition application or any other means whereby a user of the device 100 may provide input data to the at least one processing device 102. The display 108, may comprise any conventional display mechanism such as a cathode ray tube (CRT), flat panel display, or any other display mechanism known to those having ordinary skill in the art. In an embodiment, the display 108, in conjunction with suitable stored instructions 116, may be used to implement a graphical user interface. Implementation of a graphical user interface in this manner is well known to those having ordinary skill in the art. The peripheral interface 110 may include the hardware, firmware and/or software necessary for communication with various peripheral devices, such as media drives (e.g., magnetic disk or optical disk drives), other processing devices or any other input source used in connection with the instant techniques. Likewise, the other output device(s) 112 may optionally comprise similar media drive mechanisms, other processing devices or other output destinations capable of providing information to a user of the device 100, such as speakers, LEDs, tactile outputs, etc. Finally, the network interface 114 may comprise hardware, firmware and/or software that allows the least one processing device 102 to communicate with other devices via wired or wireless networks, whether local or wide area, private or public, as known in the art. For example, such networks may include the World Wide Web or Internet, or private enterprise networks, as known in the art.

While the device 100 has been described as one form for implementing the techniques described herein, those having ordinary skill in the art will appreciate that other, functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Furthermore, other implementations of the device 100 may include a greater or lesser number of components than those illustrated. Once again, those of ordinary skill in the art will appreciate the wide number of variations that may be used is this manner. Further still, although a device 100 is illustrated in FIG. 1, it is understood that a combination of such devices may be configured to operate in conjunction (for example, using known networking techniques) to implement the teachings of the instant disclosure.

Figure 2:
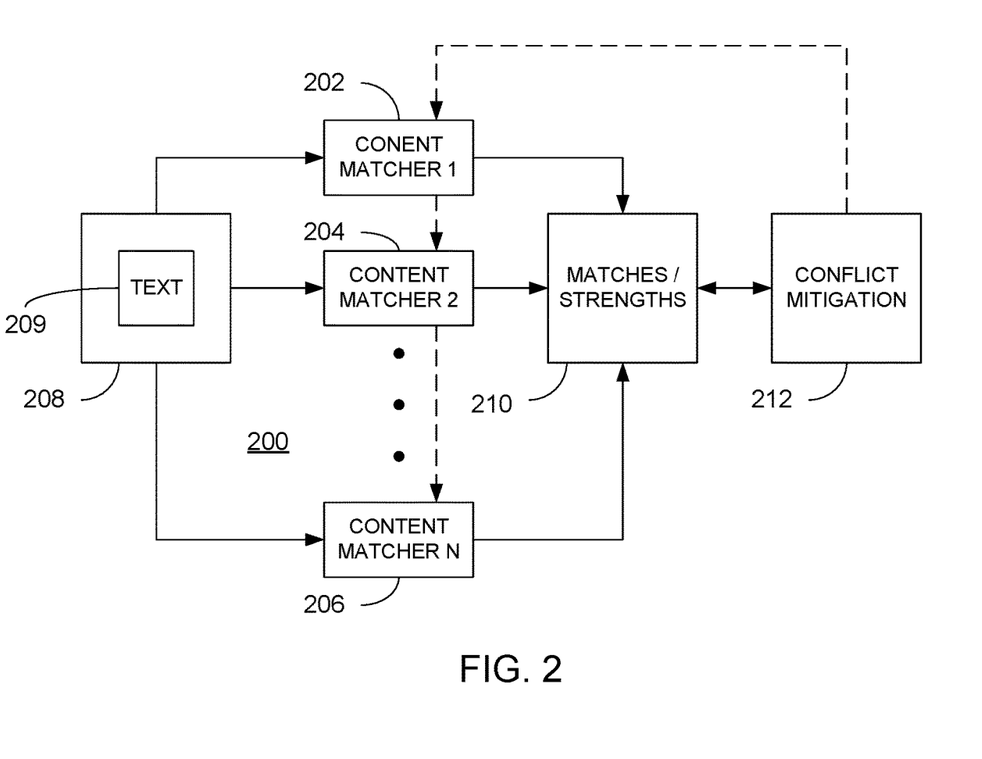
FIG. 2 is a block diagram schematically illustrating a system for performing automated document analysis including mitigation of conflicts between content matchers in accordance with the instant disclosure.

FIG. 2 is a block diagram schematically illustrating a system 200 for performing automated document analysis and mitigating conflicts between content matchers in accordance with the instant disclosure. As shown, the system 200 comprise at least two content matchers 202-206; in the illustrated example, N different content matchers, where N>2, are shown. Each of the content matchers 202-206, which may be implemented by the device 100 illustrated in FIG. 1, operate upon a document 208 comprising a body of text 209. As used herein, a given content type specifies individual words or groups of words in the body of text having in common traits or characteristics that distinguish them as a group or class. More particularly, in an embodiment, each content type described herein is differentiated by its semantic significance, i.e., by the kinds of information conveyed by words fitting within that content type. For example, by way of non-limiting example, content types that may be used include "names," "locations," "dates," "currencies," etc. As further used herein, an occurrence or match of a content type is a word or group of words found within the text of a document that may be deemed as fitting within that content type. For example, various occurrences of a "location" content type include "USA," "Chicago," "Wrigley Field," "1901 North Roselle Road," etc.

Consequently, each of the content matchers 202-206 implements a different content type recognition technique. For example, recognition techniques specifically directed to each of the above-mentioned content type examples are well known in the art, and are typically based on predefined dictionaries of known words or regular expressions configured to identify patterns typically associated with a given content type. Within any given content type, specifically tailored content matchers may be employed. For example, within the "name" content type, specialized techniques for identifying occurrences of company names may be employed, a presently preferred example of which is further described in co-pending U.S. patent application entitled "AUTOMATED DOCUMENT ANALYSIS COMPRISING MULTIPLE PASSES BY COMPANY NAME RECOGNITION COMPONENTS" having U.S. patent application Ser. No. 15/249,374. It is noted that the teachings of the instant disclosure are not limited to any particular content type or content type recognition technique, which may be selected as a matter of design choice.

A feature of the instant disclosure is the assignment of ranks to each of the content matchers 202-206. For example, each content matcher can be assigned a rank, from lowest to highest, of 1, 2 or 3 such that assessments made by content matchers having a higher rank will be favored over assessments made by content matchers having a lower rank. It is appreciated that the particular scale used for such ranking (e.g., fewer or more ranks, different labels applied to such ranks, etc.) may be selected as a matter of design choice. In an embodiment, the relative rank of each content matcher may be dictated by the nature of the document being analyzed. For example, in a system comprising a date content matcher, a company name content matcher and a unit of measurement content matcher, usage of the system on legal documents may be facilitated by ranking the company name content matcher at the highest level, the data content matcher at an intermediate level and the unit of measurement content matcher at the lowest level. On the other hand, where that same system is used to analyze an engineering document, the company name content matcher may be ranked at the lowest level, the data content matcher may remain at the intermediate level and the unit of measurement content matcher ranked at the highest level.

As used herein, the document 208 may comprise any electronic document in which the individual elements forming the body of text 209 may be accessed, and includes (but is not limited to) document created using any known word processing program, e.g., the "MICROSOFT" Word processing program. While the examples described herein are set forth in the English language, it will be appreciated that the devices and techniques described herein may be equally applied to virtually any language. In fact, as will be appreciated by those having skill in the art, known techniques may be used to split the body of text 209, regardless of the underlying language, into meaningful elements thereof often referred to tokens typically consisting of individual words, but also possibly including phrases (e.g., "et al"), numbers (e.g., "60601"), symbols (e.g., "$"), punctuation (e.g., ","), individual characters or other groupings of characters of such (e.g., "U.S.").

Those having skill in the art will appreciate that various types of "preprocessing" of the document 208 may be performed in accordance with known techniques prior to processing in accordance with the instant disclosure. For example, a tokenizer may operate upon the text 209 in order to identify individual tokens or groups thereof. Further still, a part of speech label (e.g., noun, verb, adjective, etc.) may be assigned to each word or token in the text 209. In an embodiment particularly applicable to company names, roman numerals and superscripted numbers are preprocessed because roman numerals are often part of company names (e.g., Freedom Solutions Holding II), whereas superscripted numbers are not (e.g., Apple Computer). Further still, in an embodiment, casing of words (i.e., upper case, lower case, mixed cases, capitalized) may also be preprocessed.

Another feature of the instant disclosure is the assignment of strengths to matches identified by the content matchers 202-206. For example, in an embodiment, each content matcher may observe four possible states concerning potential matches: "no match," "weak," "solid" and "definite." For example, in the case of a content manager configured to recognize dates, the use of "may" in the string "you may proceed" would rank as "no match" because the use in this case clearly does not refer to the month; the use of "May" in the string "will May bring" would be assigned a "weak" strength to the extent that the initial capital letter in "May" suggests the month, but the surrounding context is ambiguous; the use of "May" in the string "to May 1, 2017" would be assigned a "solid" strength to the extent that "May 1, 2017" would clearly be identified as a date, but the context is once again ambiguous; whereas the use of "May" in the string "Date: Monday, May 1, 2017" would be assigned a "definite" strength to the extent that all characteristics of its use and its context strongly point to a date match. It will be appreciated that different strength rating systems, possibly having more or fewer rankings than the example described herein, could be equally employed.

Techniques for content matchers to assign such strengths are well known in the art. For example, in the case of content matchers that relying on predefined patterns to identify matches, the patterns themselves are usually marked with a strength. As a further example, a date content matcher can have a pattern defined as "day of week, month spelled, day of month with 'st' or 'nd' or 'rd' or 'th' ending, and four-digit year" (e.g., "Tuesday, Aug. 23, 2016") that would be characterized as "definite" because satisfaction of the extensive criteria defining the pattern will virtually always correctly identify a date. As an opposite example, a pattern defined simply as "month spelled" (e.g., "April" or "May") would be characterized as weak because, though it is capable of identifying a month, it is equally capable of mistakenly identifying the name of a person or company as a date. Additionally, as known in the art, most matchers have further qualifications in addition to pattern matches. For example, seeing the words or strings "on" or "Date:" increases the strength of a matched pattern. As an opposite example, the presence of mathematical operators in association with a numeric date pattern such as "1/2/77+4" decrease the assessed strength of such a string to "no match."

Thus, with reference once again to FIG. 2, each of the content matchers 202-206 analyzes the body of text 209 according to its own rules and assigns a strength to any potential matches identified in the body of text by that content matcher. Thus, it is possible for any given textual element, group of such elements or overlapping groups of elements to have different strengths assigned thereto by the different content matchers 202-206. As used herein, a conflict generally arises when two different content matchers assign potentially matching status to a single portion of text or to two or more overlapping portions of text.

As further shown in FIG. 2, the conflict mitigation component 212 operates upon the identified matches and their corresponding strengths, stored in an appropriate storage device 210, in order to both identify conflicts and resolve such conflicts to the extent possible, as described below with reference to FIG. 3. As depicted by the double-sided arrow between the storage device 210 and the conflict mitigation component 212, the mitigation technique applied by the conflict mitigation component 212 may result in one or more potential content matches being discarded. To the extent that such discarded matches effectively represent new information not previously considered by the various content matchers 202-206, the conflict mitigation component 212 can instantiate operation of any of the various content matchers 202-206 (as represented by the dotted arrows) such that a content matcher that had one of its previously-designated matches discarded can re-evaluate the corresponding text in light of the new information.

Figure 3:
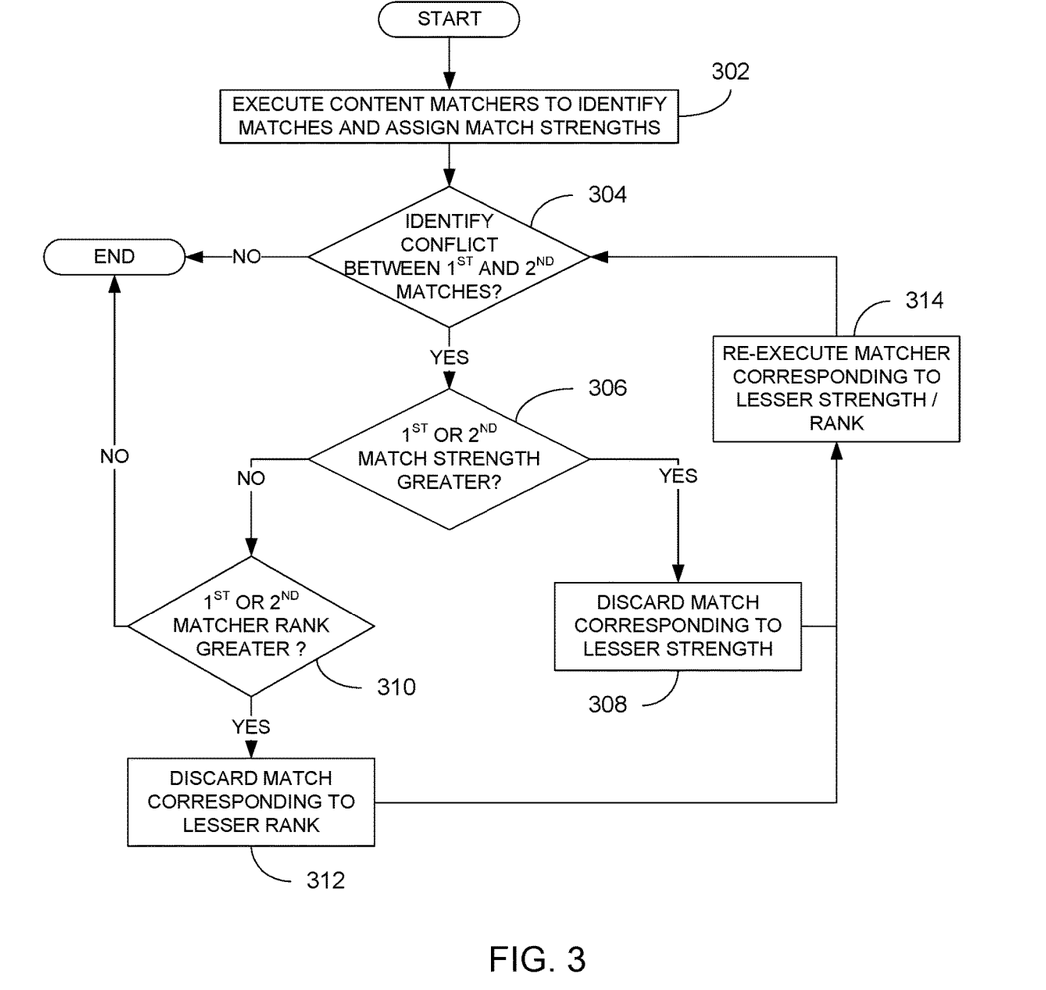
FIG. 3 is a flowchart illustrating an embodiment of processing for automated document analysis in accordance with the instant disclosure.

FIG. 3 is a flowchart illustrating an embodiment of processing for automated document analysis in accordance with the instant disclosure, particularly applicable to operation of the above-described conflict mitigation component 212. Thus, beginning at block 302, each of a plurality of content matchers is executed on a body of text such that each content matcher identifies at least one match in the body of text and assigns a match strength to each such match. Table 1 below sets forth an example in which three content matchers are executed—a date content matcher, a name content matcher and a unit of measurement content matcher. As further shown, each matcher assigns a strength to two different tokens in the example, i.e., "May" and "2000." Further still, each matcher is assigned a rank in accordance with the example above, i.e., 1-3 from lowest rank to highest rank.

TABLE 1

| Content Matcher | Rank | "Aunt May baked" | "On Jan. 1, 2000 ml of fluid" |
|---|---|---|---|
| Date | 1 | weak | solid |
| Name | 3 | solid | no match |
| Unit of measurement | 2 | no match | solid |

Referring once again to FIG. 3, processing proceeds to block 304 where a determination is made whether there are any conflicts as a result of the operation of the content matchers at block 302. If no such conflict is found, then processing is terminated. With reference to the example of Table 1, it is seen that two conflicts exist; between the date and name content matchers with respect to the token "May," and between the date and unit of measurement content matchers with respect to the token "2000."

Where at least one conflict is detected at block 304, processing continues at block 306 where a determination is made as between two conflicting content matchers—labeled "first" and "second" in FIG. 3—whether a first match strength or a second match strength is greater than the other. For example, with reference to Table 1, it would be determined with respect to the "May" token that the match strength assigned by the name content matcher is greater than the match strength assigned by the date content matcher, i.e., a "solid" match is greater than a "weak" match. On the other hand, with respect to the "2000" token, the match strength assigned by both the unit of measurement content matcher and the date content matcher, i.e., both a "solid" match, would be equal.

In the case where a first match strength for a conflict is greater than a second match strength, processing continues at block 308 where that match corresponding to the lesser match strength, i.e., the second match, is discarded. With reference again to the "May" example of Table 1, the match previously established by the date content matcher would be discarded in light of the stronger strength assigned to "May" by the name content matcher. Note that the relative matcher ranks of the first and second matchers in this example are not taken into consideration in order to resolve this conflict.

If the condition of block 306 is not satisfied, i.e., the first and second strengths associated with the conflict are equal, processing continues at block 310 where a determination is made whether either of the first or second matcher ranks associated with the first and second matches are greater than the other. If not (i.e., the matcher ranks are equal), processing terminates, in which case both conflicting matches are allowed to stand, in which case a user of the system may need to discriminate the desired meaning. Alternatively, in those cases where it is strongly desired to avoid false positives, the decision could be made to discard both matches. Regardless, if the inquiry at block 310 is answered in the positive, processing continues at block 312 where that match corresponding to the lesser matcher rank is discarded. With reference again to the "2000" example of Table 1, the fact that the first and second strengths are equal would lead to consideration of the relative ranks of the date and unit of measurement content matchers. In this case, the "2" rank of the unit of measurement content matcher is greater than the "1" rank of the date content matcher. Consequently, the match previously established by the date content matcher would be discarded.

In the event that any match is discarded, either at block 308 or 312, processing continues at block 314 where that content matcher corresponding to the discarded match is re-executed on at least that portion of the text giving rise to the conflict so that the content matcher can re-evaluate its prior decision taking into account the new information, i.e., that the text in question has been identified as a different content type. Such new information could also have an effect on that content matcher's assessment of those tokens establishing the context of that portion of text that lead to the initial conflict determination. For example, where the determination made by the date content matcher with regard to the "2000" token in the previously described example is discarded, re-evaluation by the date content matcher will take into account that the "2000" token does not contribute to a date match. Consequently, the date content matcher can nevertheless find a match on the tokens "January 1," albeit possibly assessed at a lesser strength such as "weak." Subsequent to the re-evaluation of block 314, the processing of blocks 304-312 may be performed once again to take into account any additional information resulting from the re-evaluation of block 314.

It should be noted that, while FIG. 3 illustrates execution of all content matchers at block 302 prior to performance of the mitigation operations of blocks 304-312 on any identified conflicts, this is not a requirement. In particular, it may be desirable instead to execute each content matcher and perform the content mitigation of blocks 304-312 prior to executing another content matcher. This is a particularly desirable strategy if the order in which the content matchers are executed is established by the ranks of the content matchers such that the highest rank content matchers are executed first followed by lower ranking content matchers. In this manner, lower ranking conflict matchers may cause discarding of a prior match by a higher ranking content matcher only when the lower ranking content matcher assigns a higher strength (not equal or lesser).

While particular preferred embodiments have been shown and described, those skilled in the art will appreciate that changes and modifications may be made without departing from the instant teachings. It is therefore contemplated that any and all modifications, variations or equivalents of the above-described teachings fall within the scope of the basic underlying principles disclosed above and claimed herein.

What is claimed is:

1. A method for performing, by at least one processing device, automated document analysis of a document comprising a body of text, the method comprising:

executing, by the at least one processing device, a plurality of content matchers to generate, for each content matcher, at least one match in the body of the text and to assign a match strength to each of the at least one match of each of the plurality of content matchers, the at least one match of each respective content matcher being (i) an identification of a token in the body of text, each token being a group of one or more characters of text in the body of text, and (ii) an assertion that the identified token belongs to a predefined class of tokens corresponding to the respective content matcher of the plurality of content matchers that generated the at least one match;

identifying, by the at least one processing device, a conflict between (i) a first content matcher of the plurality of content matchers that generates a first match for a first token in the document, the first match asserting, with a first match strength, that the first token in the document belongs to a first class of tokens, and (ii) a second content matcher of the plurality of content matchers that generates a second match for the first token in the document, the second match asserting, with a second match strength, that the first token in the document belongs to a second class of tokens, the first class of tokens being distinct from the second class of tokens such that the first token in the document cannot belong to both the first class of tokens and the second class of tokens, the first content matcher having a first matcher rank and the second content matcher having a second matcher rank;

determining, by the at least one processing device, whether either the first match strength or the second match strength is greater than the other;

responsive to a determination that neither the first match strength nor the second match strength is greater than the other, determining whether either the first matcher rank or the second matcher rank is greater than the other;

responsive to a determination that one of the first matcher rank or the second matcher rank is greater than the other, discarding the match of the first and second matches corresponding to the lesser of the first and second matcher ranks; and responsive to a determination that the first matcher rank and the second matcher rank are equal, determining, by the at least one processing device, whether to discard both the first and the second matches or to keep both the first and second matches.

2. The method of claim 1, wherein each respective content matcher of the plurality of content matchers has a corresponding matcher rank, and wherein executing each content matcher of the plurality of content matchers further comprises executing each content matcher in an order determined from highest matcher rank to lowest matcher rank of the corresponding matcher ranks of each of the plurality of content matchers.

3. The method of claim 1, further comprising:
re-executing, by the at least one processing device, the content matcher of the first and second content matchers corresponding to the lesser of the first and second match strengths on at least the first token in the document.

4. The method of claim 3, further comprising:
re-executing, by the at least one processing device, the content matcher of the first and second content matchers corresponding to the lesser of the first and second matcher ranks on at least the first token in the document.

5. The method of claim 1, further comprising:
responsive to the determination that the first matcher rank and the second matcher rank are equal and to the determination to discard both the first and the second matches, discarding both the first and the second matches.

6. The method of claim 1, further comprising:
responsive to the determination that the first matcher rank and the second matcher rank are equal and to the determination to keep both the first and second matches, keeping both the first and second matches.

7. The method of claim 1, further comprising:
responsive to the determination that one of the first matcher rank or the second matcher rank is greater than the other, keeping the match of the first and second matches corresponding to the greater of the first and second matcher ranks.

8. The method of claim 1, wherein the first match strength is an estimate of whether the assertion that the first token in the document belongs to the first predefined class of tokens is correct, and wherein the second match strength is an estimate of whether the assertion that the first token in the document belongs to the second predefined class of tokens is correct.

9. The method of claim 1, wherein the first matcher rank is a favorability level of the first predefined class of tokens, and wherein the second matcher rank is a favorability level of the second predefined class of tokens.

10. An apparatus configured to perform automated document analysis of a document comprising a body of text, the apparatus comprising:
at least one processing device; and
memory operatively connected to the at least one processing device, the memory having stored thereon executable instructions that, when executed by the at least one processing device, configure the at least one processing device to:
execute, by the at least one processing device, a plurality of content matchers to generate, for each content matcher, at least one match in the body of the text and to assign a match strength to each of the at least one match of each of the plurality of content matchers, the at least one match of each respective content matcher being (i) an identification of a token in the body of text, each token being a group of one or more characters of text in the body of text, and (ii) an assertion that the identified token belongs to a predefined class of tokens corresponding to the respective content matcher of the plurality of content matchers that generated the at least one match;
identify, by the at least one processing device, a conflict between (i) a first content matcher of the plurality of content matchers that generates a first match for a first token in the document, the first match asserting, with a first match strength, that the first token in the document belongs to a first class of tokens, and (ii) a second content matcher of the plurality of content matchers that generates a second match for the first token in the document, the second match asserting, with a second match strength, that the first token in the document belongs to a second class of tokens, the second class of tokens being distinct from the first class of tokens such that the first token in the document cannot belong to both the first class of tokens and the second class of tokens, the first content matcher having a first matcher rank and the second content matcher having a second matcher rank;
determine, by the at least one processing device, whether either the first match strength or the second match strength is greater than the other;
responsive to a determination that neither the first match strength nor the second match strength is greater than the other, determine whether either the first matcher rank or the second matcher rank is greater than the other;
responsive to a determination that one of the first matcher rank or the second matcher rank is greater than the other, discard the match of the first and second matches corresponding to the lesser of the first and second matcher ranks; and
responsive to a determination that the first matcher rank and the second matcher rank are equal, determine, by the at least one processing device, whether to discard both the first and the second matches or to keep both the first and second matches.

11. The apparatus of claim 10, wherein each respective content matcher of the plurality of content matchers has a corresponding matcher rank, and wherein executing each content matcher of the plurality of content matchers further comprises executing each content matcher in an order determined from highest matcher rank to lowest matcher rank of the corresponding matcher ranks of each of the plurality of content matchers.

12. The apparatus of claim 10, the memory further comprising executable instructions that, when executed by the at least one processing device, configure the at least one processing device to:

re-execute, by the at least one processing device, the content matcher of the first and second content matchers corresponding to the lesser of the first and second match strengths on at least the first token in the document.

13. The apparatus of claim 12, the memory further comprising executable instructions that, when executed by the at least one processing device, configure the at least one processing device to:

re-execute, by the at least one processing device, the content matcher of the first and second content matchers corresponding to the lesser of the first and second matcher ranks on at least the first token in the document.

14. The apparatus of claim 10, the memory further comprising executable instructions that, when executed by the at least one processing device, configure the at least one processing device to:

responsive to the determination that the first matcher rank and the second matcher rank are equal and to the determination to discard both the first and the second matches, discard both the first and the second matches.

15. The apparatus of claim 10, the memory further comprising executable instructions that, when executed by the at least one processing device, configure the at least one processing device to:

responsive to the determination that the first matcher rank and the second matcher rank are equal and to the determination to keep both the first and the second matches, keep both the first and second matches.

16. The apparatus of claim 10, the memory further comprising executable instructions that, when executed by the at least one processing device, configure the at least one processing device to:

responsive to the determination that one of the first matcher rank or the second matcher rank is greater than the other, keep the match of the first and second matches corresponding to the greater of the first and second matcher ranks.

17. The apparatus of claim 10, wherein the first match strength is an estimate of whether the assertion that the first token in the document belongs to the first predefined class of tokens is correct, and wherein the second match strength is an estimate of whether the assertion that the first token in the document belongs to the second predefined class of tokens is correct.

18. The apparatus of claim 10, wherein the first matcher rank is a favorability level of the first predefined class of tokens, and wherein the second matcher rank is a favorability level of the second predefined class of tokens.

19. A non-transitory computer readable medium storing instructions, which when executed, configure at least one processor to perform automated document analysis of a document comprising a body of text, the at least one processing device being configured by the stored instructions to:

execute, by the at least one processing device, a plurality of content matchers to generate, for each content matcher, at least one match in the body of the text and to assign a match strength to each of the at least one match of each of the plurality of content matchers, the at least one match of each respective content matcher being (i) an identification of a token in the body of text, each token being a group of one or more characters of text in the body of text, and (ii) an assertion that the identified token belongs to a predefined class of tokens corresponding to the respective content matcher of the plurality of content matchers that generated the at least one match;

identify, by the at least one processing device, a conflict between (i) a first content matcher of the plurality of content matchers that generates a first match for a first token in the document, the first match asserting, with a first match strength, that the first token in the document belongs to a first class of tokens, and (ii) a second content matcher of the plurality of content matchers that generates a second match for the first token in the document, the second match asserting, with a second match strength, that the first token in the document belongs to a second class of tokens, the second class of tokens being distinct from the first class of tokens such that the first token in the document cannot belong to both the first class of tokens and the second class of tokens, the first content matcher having a first matcher rank and the second content matcher having a second matcher rank;

determine, by the at least one processing device, whether either of first match strength or the second match strength is greater than the other;

responsive to a determination that neither the first match strength nor the second match strength is greater than the other, determine whether either the first matcher rank or the second matcher rank is greater than the other;

responsive to a determination that one of the first matcher rank or the second matcher rank is greater than the other, discard the match of the first and second matches corresponding to the lesser of the first and second matcher ranks; and responsive to a determination that the first matcher rank and the second matcher rank are equal, determine, by the at least one processing device, whether to discard both the first and the second matches or to keep both the first and second matches.

20. The non-transitory computer readable medium of claim 19, wherein each respective content matcher of the plurality of content matchers has a corresponding matcher rank, and wherein executing each content matcher of the plurality of content matchers further comprises executing each content matcher in an order determined from highest matcher rank to lowest matcher rank of the corresponding matcher ranks of each of the plurality of content matchers.

21. The non-transitory computer readable medium of claim 19, further comprising executable instructions that, when executed by the at least one processing device, configure the at least one processing device to:

re-execute, by the at least one processing device, the content matcher of the first and second content matchers corresponding to the lesser of the first and second match strengths on at least the first token in the document.

22. The non-transitory computer readable medium of claim 21, further comprising executable instructions that, when executed by the at least one processing device, configure the at least one processing device to:

re-execute, by the at least one processing device, the content matcher of the first and second content matchers corresponding to the lesser of the first and second matcher ranks on at least the first token in the document.

23. The non-transitory computer readable medium of claim 19, further comprising executable instructions that, when executed by the at least one processing device, configure the at least one processing device to:
responsive to the determination that the first matcher rank and the second matcher rank are equal and to the determination to discard both the first and the second matches, discard both the first and the second matches.

24. The non-transitory computer readable medium of claim 19, further comprising executable instructions that, when executed by the at least one processing device, configure the at least one processing device to:
responsive to the determination that the first matcher rank and the second matcher rank are equal and to the determination to keep both the first and the second matches, keep both the first and the second matches.

25. The non-transitory computer readable medium of claim 19, further comprising executable instructions that, when executed by the at least one processing device, configure the at least one processing device to:
responsive to the determination that one of the first matcher rank or the second matcher rank is greater than the other, keep the match of the first and second matches corresponding to the greater of the first and second matcher ranks.

26. The non-transitory computer readable medium of claim 19, wherein the first match strength is an estimate of whether the assertion that the first token in the document belongs to the first predefined class of tokens is correct, and wherein the second match strength is an estimate of whether the assertion that the first token in the document belongs to the second predefined class of tokens is correct.

27. The non-transitory computer readable medium of claim 19, wherein the first matcher rank is a favorability level of the first predefined class of tokens, and wherein the second matcher rank is a favorability level of the second predefined class of tokens.

* * * * *

UNITED STATES PATENT AND TRADEMARK OFFICE
CERTIFICATE OF CORRECTION

PATENT NO. : 11,361,162 B2
APPLICATION NO. : 16/719649
DATED : June 14, 2022
INVENTOR(S) : Cook et al.

It is certified that error appears in the above-identified patent and that said Letters Patent is hereby corrected as shown below:

On the Title Page

Item (72) should be corrected to read:
--David A. Cook, Barrington, IL (US); Andrzej H. Jachowicz, Tower Lakes, IL (US); Phillip Karl Jones, Barlett, IL (US)--

Signed and Sealed this
Twenty-ninth Day of November, 2022

*Katherine Kelly Vidal*

Katherine Kelly Vidal
*Director of the United States Patent and Trademark Office*